United States Patent [19]

Chen

[11] Patent Number: 4,931,188

[45] Date of Patent: * Jun. 5, 1990

[54] POLYMERS FOR BOILER WATER TREATMENT

[75] Inventor: Fu Chen, Newtown, Pa.

[73] Assignee: Betz Laboratories, Inc., Trevose, Pa.

[*] Notice: The portion of the term of this patent subsequent to Mar. 6, 2007 has been disclaimed.

[21] Appl. No.: 338,016

[22] Filed: Apr. 14, 1989

Related U.S. Application Data

[63] Continuation-in-part of Ser. No. 220,195, Jul. 18, 1988, Pat. No. 4,895,664, which is a continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^5$ .............................................. C02F 5/14
[52] U.S. Cl. .................................. 210/697; 210/698; 210/701; 252/180; 252/181
[58] Field of Search .............................. 210/696–701; 252/180, 181; 422/15–19

[56] References Cited

U.S. PATENT DOCUMENTS

| | | | |
|---|---|---|---|
| 3,331,773 | 7/1967 | Gunderson et al. | 210/701 |
| 4,288,327 | 7/1986 | Godlewski et al. | 210/698 |
| 4,457,847 | 12/1987 | Lorenc et al. | 210/698 |
| 4,469,615 | 9/1984 | Tsurnoka et al. | 252/180 |
| 4,500,693 | 2/1985 | Takehara et al. | 526/240 |
| 4,549,968 | 10/1985 | Muccitelli | 210/750 |
| 4,659,480 | 4/1987 | Chen et al. | 210/697 |
| 4,659,481 | 4/1987 | Chen | 210/697 |
| 4,680,124 | 7/1987 | Young et al. | 210/697 |
| 4,701,262 | 10/1987 | Chen | 210/699 |
| 4,708,815 | 11/1987 | Chen et al. | 252/181 |
| 4,717,499 | 1/1988 | Chen | 252/181 |
| 4,732,698 | 3/1988 | Chen | 252/181 |
| 4,759,851 | 7/1988 | Chen | 210/697 |
| 4,836,933 | 6/1989 | Montague et al. | 210/701 |

FOREIGN PATENT DOCUMENTS

| | | |
|---|---|---|
| 0142929 | 5/1985 | European Pat. Off. |
| 2522637 | 12/1976 | Fed. Rep. of Germany |
| 56-155692 | 12/1981 | Japan |
| 59-135202 | 8/1984 | Japan ......... 210/698 |

Primary Examiner—Peter Hruskoci
Attorney, Agent, or Firm—Alexander D. Ricci; Gregory M. Hill

[57] ABSTRACT

Methods of using novel water soluble polymers to inhibit corrosion and control the formation and deposition of scale imparting compounds in boiler water systems are disclosed. The polymers are comprised of repeat units formed from $\gamma, \beta$ ethylenically unsaturated compounds, and repeat units formed from allylalkylene ether monomers.

13 Claims, No Drawings

POLYMERS FOR BOILER WATER TREATMENT

This is a continuation-in-part of application Ser. No. 220,195 filed on July 18, 1988 now U.S. Pat. No. 4,895,664 which is a continuation-in-part of application Ser. No. 037,484 filed Apr. 13, 1987, now U.S. Pat. No. 4,759,851 which is a continuation of Ser. No. 864,049 filed May 16, 1986, now U.S. Pat. No. 4,659,481 which in turn is a continuation of Ser. No. 545,563 filed Oct. 26, 1983, now abandoned.

FIELD OF THE INVENTION

The present invention pertains to a method of utilizing novel polymers to inhibit corrosion and control the formation and deposition of scale imparting compounds in steam generating systems such as boiler water systems.

BACKGROUND OF THE INVENTION

The problems of corrosion and scale formation and attendant effects have troubled water systems for years. For instance, scale tends to accumulate on internal walls of various water systems, such as boiler and cooling systems, thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

As detailed in the Betz Handbook of Industrial Water Conditioning, 8th Edition, 1980, Betz Laboratories, Inc., Trevose, PA Pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also water having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

SUMMARY OF THE INVENTION

It has been discovered that water soluble copolymers, as shown in Formula I hereinafter, are effective in controlling the formation of mineral deposits and in inhibiting corrosion in steam generating systems such as boiler water systems.

The water soluble copolymers of the invention have the structure:

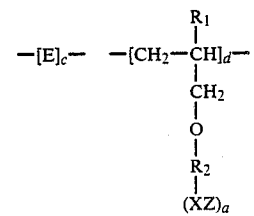

wherein E is the repeat unit remaining after polymerization of an ethylenically unsaturated compound, $R_1$ is H or lower ($C_1$-$C_3$) alkyl, $R_2$ is a hydroxy substituted alkyl or alkylene having from 1 to about 6 carbon atoms or a non-substituted alkyl or alkylene having from 1 to about 6 carbon atoms; a is 0 or 1, X is an anionic radical selected from the group consisting of $SO_3$, $PO_3$, $PO_4$, and COO, Z is H or a water soluble cation or cations, Z being chosen to counterbalance the valence of X, XZ combined may also denote an amino functionality of the formula

wherein $F_1$ and $F_2$ are independently selected from H, and $C_1$-$C_5$ alkyl, the molar ratio of repeat units c:d being from about 30:1 to about 1:20.

In accordance with the method, from 0.1 to 500 parts of the allyl ether containing copolymer are admitted to the desired aqueous system, based upon one million parts of the aqueous system.

PRIOR ART

Some of the water soluble or water dispersible copolymers used in accordance with the invention are not new. For instance, U.S. Pat. No. 4,500,693 (Takehara et al) discloses water soluble copolymers having an acrylic acid or methacrylic acid repeat unit which is co-polymerized with certain allyl ether monomers. The polymers disclosed in accordance with Takehara et al are useful calcium carbonate inhibitors in cooling water systems and may also be used as a pigment dispersant. Use of those polymers for the boiler water treatment is not suggested in the '693 patent.

U.S. Pat. No. 4,469,615 (Tsuruoka et al) discloses water treatment compositions comprising a water soluble copolymer having, as the components, one repeat it formed from an addition reaction product of a glycidyl ether or glycidyl ester and an $\alpha, \beta$ ethylenically unsaturated carboxylic acid. The co-monomer may comprise any vinyl monomer. The copolymers are reported as being useful as corrosion inhibition agents in water systems.

Offenlegungsschrift 25 22 637 discloses varied acrylic acid/allyl alcohol type copolymers which may be utilized to stabilize hardness in water systems.

European Publication 0142929 (Chen) discloses water treatment polymers which are in many cases coextensive with those herein disclosed. The polymers are utilized to inhibit calcium phosphate and calcium phosphonate in aqueous systems. They also function to provide a passivated oxide film along treated metal surfaces when they are used conjointly with a water soluble orthophosphate source.

U.S. Pat. Nos. 4,659,481 (Chen) and 4,732,698 (Chen) disclose the utilization of certain (meth)acrylic acid/allyl ether copolymers that may be utilized to provide the elusive passive oxide film along water system metallurgy when used conjointly with an orthophosphate ion source. Most specifically preferred is utilization of an acrylic acid/2-hydroxypropylsulfonate ether copolymer.

U.S. Pat. Nos. 4,659,482 (Chen) and 4,717,499 (Chen) disclose use of (meth)acrylic acid/allyl ether copolymers to simultaneously inhibit corrosion and calcium carbonate deposition in cooling water systems under elevated pH (i.e., 7.5-9.0) and calcium carbonate supersaturation conditions.

U.S. Pat. No. 4,701,262 (Chen) discloses the utilization of acrylic acid/allylhydroxyalkyl ether copolymers in combination with 2-phosphonobutane 1,2,4-tricarboxylic acid to inhibit calcium sulfate and calcium carbonate scale.

U.S. Pat. No. 4,759,851 (Chen) discloses utilization of acrylic acid/allylhydroxyalkyl ether copolymers to control calcium phosphonate scale in water systems.

U.S. Pat. Nos. 4,659,480 (Chen et al) and 4,708,815 (Chen et al) disclose utilization of certain acrylic acid/allylalkylene phosphite ether copolymers in water treatment systems.

Japanese Patent Publication SHO56-155692, "Method of Collecting Dust" discloses use of acrylic acid/polyethylene glycol monoallylether copolymers which are utilized to treat the recirculating water in an aqueous dust collecting system. In this disclosure, the number of moles of ethoxylation is taught as being from 5 to 100. If the number is less than 5, the scale control and dispersant efficacies are insufficient.

U.S. Pat. No. B1 4,288,327 teaches using of sulfonated styrene/maleic anhydride copolymer for controlling the formation and deposition in an aqueous medium. U.S. Pat. No. B1 4,457,847 cites the use of certain carboxylic acid polymers to treat hardness in boiler water. The preferred polymers taught to prevent scale in the '847 patent are usually acrylic acid or methacrylic homopolymers or water-soluble copolymers of these acrylates. However, as pointed out by U.S. Pat. No. 4,680,124, such treatment is prone to form calcium-polyacrylate scale on heat transfer surfaces. Phosphorous compounds may be added to prevent the formation of calcium polyacrylate scale.

DETAILED DESCRIPTION OF THE PREFERRED EMBODIMENT

In accordance with the invention, it has been discovered that certain water soluble copolymers, as shown in Formula I hereinafter, are effective in controlling the formation of deposits and in inhibiting corrosion in steam generating systems such as boiler water systems.

The polymers comprise repeat units composed of an $\alpha, \beta$ ethylenically unsaturated compound and an allylalkylene ether based compound. The (meth)acrylic acid/allyl ether polymers useful in accordance with the invention have the structure:

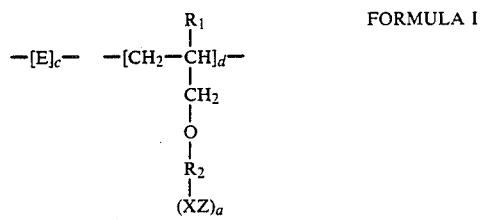

FORMULA I wherein E in the above formula is the repeat unit remaining after polymerization of an $\alpha,\beta$ ethylenically unsaturated compound, $R_1$ is H or lower ($C_1$-$C_3$) alkyl, $R_2$ is a hydroxy substituted alkyl or alkylene having from 1 to about 6 carbon atoms or a non-substituted alkyl or alkylene having from 1 to 6 carbon atoms, a is 0 or 1, X is an anionic radical selected from the group consisting of $SO_3$, $PO_3$, $PO_4$, and COO, Z is H or a water soluble cation or cations, Z being chosen to counterbalance the valence of X, XZ combined may also denote an amino functionality of the formula

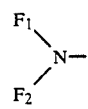

wherein $F_1$ and $F_2$ are independently selected from H and $C_1$-$C_5$ alkyl, linear or branched, the molar ratio of repeat unit c:d being from about 30:1 to about 1:20, more desirably within 15:1 to 1:10.

E in the above formula may, for instance, comprise the repeat unit remaining after polymerization of an $\alpha, \beta$ ethylenically unsaturated monomer, preferably a carboxylic acid, amide form thereof, or lower alkyl ($C_1$-$C_6$) ester or hydroxylated lower alkyl ($C_1$-$C_6$) ester of such carboxylic acid. Exemplary compounds encompassed by E include, but are not restricted to the repeat unit formed by polymerization of acrylic acid, methacrylic acid, acrylamide, maleic acid or anhydride, fumaric acid, itaconic acid, 2-hydroxypropyl acrylate, styrene sulfonic acid, and 2-acrylamido-2-methylpropanesulfonic acid and the like. Water soluble salt forms of these acids are also within the purview of the invention. These monomers are commercially available.

The second repeat unit in Formula I may include, as exemplary, repeat units formed from monomers such as 1-allyloxy-2-propanol, 1-allyloxypropane 2,3-diol (glyceryl allyl ether), 1-allyloxy-2-hydroxypropylsulfonic acid, 1-allyloxy-2-hydroxypropyl phosphite, 1-allyloxy-2-hydroxypropyl phosphonic acid, 1-allyloxy-2-hydroxybutanoic acid and water soluble salt forms of these acids.

The allyl containing monomers, monomer d, in the FORMULA I above, these may be produced by reacting allyl alcohol with an non-tertiary alcohol in the temperature range of about 25°–150° C. as is detailed in U.S. Pat. No. 2,847,477 (the entire disclosure of which is hereby incorporated by reference) followed by, if desired, sulfonation, phosphorylation, phosphonation or carboxylation of the monomer via well-known techniques. They may conveniently be prepared via a ring opening reaction of the epoxy group of an allyl glycidyl ether precursor. Synthesis of these monomers are disclosed in U.S. Pat. Nos. 4,659,481 (Chen) and 4,708,815 (Chen et al), both being of common assignment herewith and both being incorporated herein by reference. It is noted that in the case in which XZ in repeat unit (d) is an amino functionality, the monomer can be prepared in accordance with the following mechanism:

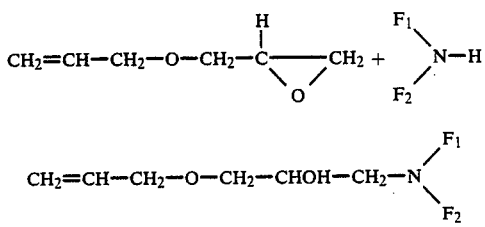

It should be mentioned that water soluble terpolymers comprising monomers E and allyl ether of Formula I may also be used in this invention. It is also to be understood that minor amount of additional monomers such as ethylene, styrene, alkylvinyl phosphonic acid, etc. may be added to the polymers.

The number average molecular weight of the water soluble copolymers of Formula I is not critical and may fall within the Mn range of from about 1,000 to 1,000,000, desirably, 1,000 to 300,000, and most desirably 1,500 to 25,000. The key criterion is that the copolymer be water soluble.

After the desired monomers have been obtained, free radical polymerization may proceed in accordance with conventional solution, precipitation or emulsion polymerization techniques. Conventional polymerization initiators such as azo compounds, persulfates, peroxides, UV light, etc. may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The polymers should be added to the aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water. The polymers may be added directly into the desired water system in a fixed quantity and in the state of an aqueous solution, continuously or intermittently.

The water soluble polymers of the present invention can also be used with topping agent components in order to enhance the corrosion inhibition and scale controlling properties thereof. For instance the polymers may be used in combination with one or more kinds of compounds selected from the group consisting of inorganic phosphoric acids, phosphonic acid salts, and polyvalent metal salts. Such topping agents may be added to the system in an amount of from about 1 to 500 ppm.

Examples of such inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, methaphosphoric acids such as trimetaphosphoric acid, and tetrametaphosphoric acid.

As to the other phosphonic acid derivatives which are to be added in addition to the polymers of the present invention, there may be mentioned aminopolyphosphonic acids such as aminotrimethylene phosphonic acid, ethylenediaminetetramethylene phosphonic acid and the like, methylene diphosphonic acid, hydroxyethylidene diphosphonic acid, 2-phosphonobutane 1,2,4 tricarboxylic acid, etc.

The polymers may be used in combination with yet other topping agents including corrosion inhibitors for iron, steel, copper, copper alloys or other metals, conventional scale and contamination inhibitors, metal ion chelating agents, and other conventional water treatment agents. Other corrosion inhibitors comprise tungstate, nitrites, borages, silicates, oxycarboxylic acids, amino acids, catechols, and aliphatic amino surface active agents. Other scale and contamination inhibitors include lignin derivatives, tannic acids, starch, polyacrylic soda, polyacrylic amide, etc. Metal ion chelating agents include polyamines, such as ethylenediamine, diethylenetriamine and the like and polyamino carboxylic acids, such as nitrilo triacetic (NTA) acid, ethylene diaminetetraacetic acid (EDTA), diethylenetriamine pentaacetic acid, hydroxyethylethylenediaminetriacetic acid (HEDTA), and salt forms of the acids mentioned. Synergistic effect may be obtained by combining the polymers of the invention with surfactants.

The present polymers can also be used along with chemicals that are capable to reduce dissolved oxygen in boiler water systems. These chemicals referred as oxygen scavenger, comprise: hydrazine, sulfite, bisulfite, hydroquinone, carbohydrazide, alkylhydroxyamines, and alkylamine, citric acid, ascorbic acid and its analogs or salt forms, etc. Amines such as morpholine, cyclohexylamine, ammonia, various alkylhydroxyamines such as diethylaminoethanol, and dimethylisopropanolamine may be used with the polymers of the invention in steam generating systems.

The water soluble polymers may be added separately to the aqueous system or may be blended with the above topping agent compounds and then added in the state of aqueous solution into the water system either continuously or intermittently.

EXAMPLES

The invention will now be further described with reference to a number of specific examples with are to be regarded solely as illustrative, and not as restricting the scope of the invention.

The polymers of the invention were prepared in accordance with the method described above. The fact that polymer were formed was substantiated by viscosity increase, gel permeation chromatography, IR, 13C and/or 31P NMR spectroscopy. Table I hereinbelow presents a summary of the physical properties of the copolymers.

TABLE I

Polymer Properties

| Copolymer | Mole Composition | Ratio | pH | Brookfield Vis. cps, 25 C (% solids) | Mn* |
|---|---|---|---|---|---|
| Example 1 | MAA/AHPS | 3/1 | 6.7 | 28.2 (25%) | 3,400 |
| Example 2 | MAA/AHPS | 6/1 | 7.0 | 58.3 (25%) | 5,800 |
| Example 3 | MAA/AHPS | 6/1 | 6.2 | 35.4 (25%) | 3,550 |
| Example 4 | MAA/AHPS | 6/1 | 6.5 | 106.4 (30.8%) | 13,000 |
| Example 5 | MAA/AOP | 6.1/1 | 6.5 | 113.0 (30%) | — |
| Example 6 | MAA/AHPP | 4/1 | 5.2 | 84.4 (25.2%) | 8,500 |
| Example 7 | MAA/AHPDEA | 6/1 | 9.6 | 38.4 (25.7%) | — |
| Example 8 | MAA/AHPDEA | 6/1 | 6.4 | 81.9 (28.7%) | — |

MAA = methacrylic acid [79-41-4]
AHPS = 1-allyloxy-2-hydroxypropyl sulfonate [52556-42-0]
AOP = 1-allyloxy-2-propanol [21460-36-6]
AHPP = 1-allyloxy-2-hydroxypropyl phosphite [11608-49-6]
AHPDEA = 1-allyloxy-2-hydroxypropyl diethylamino [14112-80-2]
*Mn, number average molecular weight, was measured by gel permeation chromatography (GPC) method using Toyo Soda G-2000 SW or G-4000 SW column calibrated with polystyrene sulfonate standards in sodium nitrate solution. Molecular weight results from GPC depend on the type of column, condition and standards used.

BOILER STUDIES

In order to assess the efficacy of the polymers of the present invention in inhibiting scale formation in steam generating systems, research boilers were fitted with two 4,000 watt electrical heater probes, giving 185,000 BTU/ft$^2$/hr and about 8 Kg/hr steam. The boiler feedwater contained the contaminants and treatment agents given hereinbelow. The boilers were operated for 44 hours per run at an average of 15 cycles of concentration. At the conclusion of each run, the deposits were cleaned from the probes with an acid solution and the deposit densities were then calculated based on the known probe surface areas. The estimated uncertainties are about 0.2 g/ft$^2$.

TABLE II

Phosphate Precipitation/Polymer Program
Condition: sodium sulfite oxygen scavenger, 900 psig, 4 ppm Ca and 1 ppm Mg (as CaCO$_3$) in feed water.
Phosphate added to produce about 30 ppm PO$_4$.

| Polymer | Treatment Dosage (ppm active) | Average Deposit (g/ft$^2$) |
|---|---|---|
| Control | 0 | 8.1 |
| Example 1 | 2.5 | 0.59 |
| Example 1 | 5.0 | 0.28 |
| Example 1 | 7.5 | 0.20* |
| Example 1 | 10.0 | 0.18 |
| Example 2 | 2.5 | 0.40* |
| Example 2 | 5.0 | 0.27 |
| Example 2 | 7.5 | 0.45* |
| Example 2 | 10.0 | 0.36 |
| Example 3 | 2.5 | 0.38* |
| Example 3 | 5.0 | 0.27 |
| Example 3 | 10.0 | 0.35 |
| Example 5 | 2.5 | 0.25 |
| Example 5 | 5.0 | 0.24 |
| Example 5 | 10.0 | 0.24 |
| Example 6 | 5.0 | 0.26 |
| Example 6 | 10.0 | 0.20 |
| Example 6 | 20.0 | 0.56 |
| Example 7 | 2.5 | 0.99 |
| Example 7 | 5.0 | 0.22 |
| Example 8 | 5.0 | 2.19 |
| Example 8 | 10.0 | 0.21 |

TABLE II-continued

Phosphate Precipitation/Polymer Program
Condition: sodium sulfite oxygen scavenger, 900 psig, 4 ppm Ca and 1 ppm Mg (as CaCO$_3$) in feed water.
Phosphate added to produce about 30 ppm PO$_4$.

| Polymer | Treatment Dosage (ppm active) | Average Deposit (g/ft$^2$) |
|---|---|---|
| Example 8 | 20.0 | 0.41 |

*Average of two runs.

TABLE III

Chelant/Polymer Program
Condition: sodium sulfite oxygen scavenger, 900 psig, 4 ppm Ca, 1 ppm Mg, and 1 ppm Fe in feedwater, stoichiometric amount of EDTA added.

| Polymer | Treatment Dosage (ppm active) | Average Deposit (g/ft$^2$) |
|---|---|---|
| Control | 0 | 2.0-3.0 |
| Example 1 | 2.5 | 0.79 |
| Example 1 | 5.0 | 0.49 |
| Example 1 | 5.0 | 0.19 |
| Example 2 | 2.5 | 2.5 |
| Example 2 | 5.0 | 0.65 |
| Example 2 | 5.0 | 0.25 |
| Example 3 | 2.5 | 0.24 |
| Example 3 | 5.0 | 1.05 |

TABLE IV

Coordinated Phosphate/pH/Polymer Program
Condition: Hydrazine oxygen scavenger, 1450 psig, 5 ppm Fe in feedwater, phosphate added to produce 7 ppm PO$_4$ as Ca

| Polymer | Treatment Dosage (ppm active) | Average Deposit (g/ft$^2$) |
|---|---|---|
| Example 1 | 5.0 | 2.55 |
| Example 2 | 5.0 | 2.2 |
| PMA | 5.0 | 0.93 |

PMA = polymethacrylic acid

TABLE V

All Polymer Program
Condition: sodium sulfite oxygen scavenger, 600 psig, 4 ppm Ca, 1 ppm Mg, and 1 ppm Fe in feedwater

| Polymer | Treatment Dosage (ppm active) | Average Deposit (g/ft$^2$) |
|---|---|---|
| Example 4 | 0 | 4.08 |
| Example 4 | 38 | 0.64 |
| Example 4 | 76 | 0.39 |
| Example 4 | 126 | 0.22 |
| Example 4 | 151 | 0.17 |
| Example 4 | 504 | 0.15 |

It is to be understood that the above boiler studies in no way limit the utility of the present invention for other boiler treatment programs.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of controlling the deposition of scale imparting precipitates on the structural parts of a steam generating system exposed to an aqueous medium containing scale imparting precipitates under deposit forming conditions, said method comprising adding to said aqueous medium an effective amount for the purpose of a water soluble polymer having repeat units of the structure:

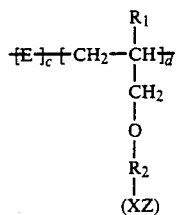

wherein E is acrylic acid, methacrylic acid or polymerized mixtures thereof, $R_1$ is H or lower ($C_1$–$C_3$) alkyl, $R_2$ is 2-hydroxypropylene, XZ is an amino functionality of the formula

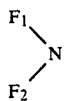

wherein $F_1$ and $F_2$ are independently selected from H and $C_1$–$C_5$ alkyl, the molar ratio of repeat units c:d being from about 15:1 to about 1:10.

2. The method as recited in claim 1 wherein $R_1$ is H, XZ is diethylamino.

3. The method as recited in claim 1 wherein $R_1$ is H, $R_2$ is 2-hydroxypropylene, XZ combined is dimethylamino.

4. The method as recited in claim 1 wherein the number average molecular weight of said water soluble polymer is between about 1,000 to 1,000,000.

5. The method as recited in claim 1 wherein the number average molecular weight of said water soluble polymer is between about 1,000 to 300,000.

6. The method as recited in claim 1 wherein the number average molecular weight of said water soluble polymer is between about 1,500 to 25,000.

7. The method as recited in claim 1 wherein said water soluble polymer is added to said aqueous medium in an amount of 0.1–500 parts polymer based upon 1 million parts of said aqueous medium.

8. The method as recited in claim 1 wherein said system is a boiler water system.

9. The method as defined in claim 1 further comprising, adding to said system, an effective amount for the purpose of a topping agent selected from the group consisting of inorganic phosphoric acids and water soluble salts thereof, phosphonic acids and water soluble salts thereof, morpholine, cyclohexylamine, ammonia, diethylaminoethanol, dimethylisopropanolamine and polyamino carboxylic acids and water soluble salts thereof.

10. The method as defined in claim 9 wherein said inorganic phosphoric acid is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

11. The method as defined in claim 9 wherein said phosphonic acid is a member selected from the group consisting of ethylene diaminetetramethylene phosphonic acid, methylene diphosphonic acid, hydroxyethylidene diphosphonic acid and 2-phosphonobutane 1,2,4-tri-carboxylic acid.

12. The method as defined in claim 9 wherein said polyamino carboxylic acid is a member selected from the group consisting of ethylenediaminetetraacetic acid, nitrilotriacetic acid, hydroxyethylethylenediaminetetraacetic acid, diethylenetriamine pentaacetic acid and water soluble salts thereof.

13. The method as defined in claim 9 wherein said topping agent is added to said system in an amount of 1 to about 500 parts per million parts of said aqueous medium.

* * * * *